US010588032B2

(12) United States Patent
Cendrillon

(10) Patent No.: US 10,588,032 B2
(45) Date of Patent: Mar. 10, 2020

(54) POWER ADJUSTMENTS FOR SELF-ORGANIZING NETWORKS

(71) Applicant: Google LLC, Mountain View, CA (US)

(72) Inventor: Raphael Cendrillon, Alameda, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 15/811,887

(22) Filed: Nov. 14, 2017

(65) Prior Publication Data

US 2019/0150005 A1    May 16, 2019

(51) Int. Cl.
*H04W 24/02*    (2009.01)
*H04W 52/24*    (2009.01)
(Continued)

(52) U.S. Cl.
CPC .......... *H04W 24/02* (2013.01); *H04B 17/336* (2015.01); *H04L 41/0823* (2013.01);
(Continued)

(58) Field of Classification Search
CPC ... H04W 24/02; H04W 52/241; H04B 17/336
See application file for complete search history.

(56) References Cited

U.S. PATENT DOCUMENTS

| 9,106,358 B2 | 8/2015 | Woo |
| 2009/0170548 A1 | 7/2009 | Soliman |

(Continued)

FOREIGN PATENT DOCUMENTS

| EP | 1830494 | 12/2009 |
| EP | 2675223 | 12/2013 |

OTHER PUBLICATIONS

'lte-questions.blogspot.com' [online] "LTE and LTE Advances Concept and Question," Jul. 10, 2013, [retrieved on Nov. 13, 2017] Retrieved from Internet: URL< http://lte-question.blogspot.com/2013/07/difference-between-srs-and-dmrs.html> 5 pages.
(Continued)

*Primary Examiner* — Kevin C. Harper
*Assistant Examiner* — Henry Baron
(74) *Attorney, Agent, or Firm* — Fish & Richardson P.C.

(57) ABSTRACT

Methods, systems, and apparatus, including computer-readable media, for making power adjustments in self-organizing networks. In some implementations, signal quality data is received for user devices that each communicate wirelessly with at least one base station in a set of base stations. Transmission power data indicating transmission power levels of the base stations is also received. Based on the signal quality data and the transmission power data, signal quality levels for the user devices are determined for different times corresponding to different combinations of transmission power levels of the base stations. Channel attenuation levels are estimated based on differences among signal quality levels of the multiple user devices corresponding to the different combinations of transmission power levels of the base stations. Operating parameters are provided to one or more of the base stations based on the estimated channel attenuation levels.

20 Claims, 5 Drawing Sheets

(51) Int. Cl.
  H04B 17/336 (2015.01)
  H04L 12/24 (2006.01)
  H04W 88/08 (2009.01)
  H04W 84/18 (2009.01)
(52) U.S. Cl.
  CPC .......... *H04W 52/241* (2013.01); *H04W 84/18* (2013.01); *H04W 88/08* (2013.01)

(56) References Cited

U.S. PATENT DOCUMENTS

| | | | | |
|---|---|---|---|---|
| 2014/0286219 | A1* | 9/2014 | Siomina | H04J 11/0023 370/311 |
| 2014/0369336 | A1 | 12/2014 | Prakash et al. | |
| 2015/0094114 | A1* | 4/2015 | Rao | H04W 52/245 455/522 |
| 2015/0141027 | A1 | 5/2015 | Tsui et al. | |

OTHER PUBLICATIONS

'rfmw.em.keysight.com' [online] "LTE Physical Layer Overview," Copyright 2000-2017 Keysight Technologies, Inc. [retrieved on Nov. 13, 2017] Retrieved from Internet: URL<http://rfmw.em.keysight.com/wireless/helpfiles/89600b/webhelp/Subsystems/lte/content/lte_overview.htm> 12 pages.

'www.allabtle.blogspot.com' [online] "All About Cell Specific Reference Signal," Dec. 17, 2013, [retrieved on Nov. 13, 2017] Retrieved from Internet: URL<http://allabrite.blogspot.com/2013/12/all-about-cell-specific-reference-signal.html> 4 pages.

'www.ee.colombia.edu,' [online] "LTE PHY Fundamentals," Roger Piqueras Jover, last update date unknown, [retrieved on Nov. 13, 2017] Retrieved from Internet: URL<http://www.ee.columbia.edu/~roger/LTE_PHY_fundamentals.pdf> 9 pages.

'www.en.wikipedia.org,' [online] "Femtocell," Last updated: Nov. 3, 2017, [ retrieved on Nov. 13, 2017] Retrieved from Internet: URL<https://en.wikipedia.org/wiki/Femtocell> 16 pages.

'www.en.wikipedia.org,' [online] "Self-organizing network," Last updated: Dec. 7, 2016, [retrieved on Nov. 13, 2017] Retrieved from Internet: URL<https://en.wikipedia.org/wiki/Self-organizing_network> 3 pages.

'www.en.wikipedia.org,' [online] "Small cell," Last updated: Sep. 12, 2017, [ retrieved on Nov. 13, 2017] Retrieved from Internet: URL< https://en.wikipedia.org/wiki/Small_cell> 4 pages.

'www.en.wikipedia.org' [online] "eNodeB," Last updated on Sep. 9, 2017, [retrieved on Nov. 13, 2017] retrieved from Internet: URL<https://en.wikipedia.org/wild/EnodeB> 2 pages.

'www.laroccasolutions.com' [online] "RSRP and RSRQ Measurement in LTE," Maurizio La Rocca, Apr. 4, 2016, [retrieved on Nov. 13, 2017] Retrieved from Internet: URL<https://www.laroccasolutions.com/78-rsrp-and-rsrq-measurement-in-lte/> 13 pages.

'www.laroccasolutions.com' [online] "RSRQ to SINR Relation," Maurizio La Rocca, Apr. 24, 2016, [retrieved on Nov. 13, 2017] Retrieved from Internet: URL<https://www.laroccasolutions.com/164-rsrq-to-sinr/> 14 pages.

'www.sharetechnote.com' [online] "Communication—Channel Estimation" last update date unknown [retrieved on Nov. 13, 2017] Retrieved from Internet: URL<http://www.sharetechnote.com/html/CommunicationChannelEstimation.html> 11 pages.

'www.sharetechnote.com' [online] "LTE Quick Reference: Reference Signal," last update date unknown [retrieved on Nov. 13, 2017] Retrieved from Internet: URL<http://www.sharetechnote.com/html/Handbook_LTE_Reference_Signal_Downlink.html> 5 pages.

Hou et al. "Demodulation Reference Signal Design and Channel Estimation for LTE-Advanced Uplink," Advances in Vehicular Networking Technologies, InTech, ISBN: 978-953-307-241-8, Apr. 11, 2011, 17 pages.

PCT International Search Report and Written Opinion issued in International Application No. PCT/US2018/045018, dated Sep. 26, 2018, 21 pages.

PCT Written Opinion issued in International Application No. PCT/US2018/045018, dated Sep. 24, 2019, 17 pages.

\* cited by examiner

POWER ADJUSTMENTS FOR SELF-ORGANIZING NETWORKS

FIELD

The present specification is related to transmission power adjustments for self-organizing networks.

BACKGROUND

Communication systems can be formed using wireless, wired, or cellular networks. For example, a wireless communications system can include an operations support system (OSS), one or more base stations (e.g., eNodeBs), and multiple communications devices, such as smartphones, laptop computers, tablets devices, or other related wireless computing devices. The OSS provides instructions that are processed by the base stations. Each base station can serve, or provide data communication services to, a set of devices within a particular geographic location. In routine operations of the communications system, The OSS can provide control signals that are received by the base stations. The control signals may specify various operating parameters for the base stations.

In some implementations, network engineers may manually adjust transmission power and other signal parameters to optimize data throughput, service quality, or other performance characteristics. In addition to manual adjustment, some forms of network automation technology can be used for management, configuration, and optimization for wireless communication systems.

SUMMARY

In some implementations, a computing system estimates wireless channel attention levels between base stations and user devices in a communications network. With the channel attenuation information, the computing system can provide settings to the base stations to improve the operation of the communications network. The user devices can provide signal quality measurements at various times. As the base stations change transmission power levels, the computing system evaluates how the different combinations of transmission power levels affect the signal quality of the user devices. From this evaluation, the computing system can estimate the degree that each of the base stations affect the signal quality of each of the user devices.

The base stations of a self-organized network (SON) can optimize their respective transmission powers and minimize signal interference to devices served by neighboring base stations. A computing system can monitor or determine a signal quality experienced by each user device (e.g., mobile device) being served by a particular base station within a specific region. The signal quality can represent, among other factors, a level of interference being experienced by that user device as result of the transmission attributes (e.g., transmission power) of base stations in the region that are not serving the mobile device.

These signal quality or interference determinations can be computed at each mobile device responsive to an incremental adjustment in transmission power by one or more base stations in the region. The signal quality and interference determinations can be used to estimate path loss values that indicate channel attenuation between each base station within the region and each user device that is served by a base station in the region. For example, the signal quality experienced by a user device can be characterized using the signal-to-interference and noise ratio (SINR). The SINR is calculated by the user device and indicates a strength of data communication signals being received from a base station serving the user device, relative to an interference from any nearby or neighboring base stations operating on the same (or similar) frequency. The strength of the data signal from the serving base station can correspond to a channel quality and available data rate (or data throughput) experienced at an assigned mobile device.

The path loss between a mobile device and a base station indicates the wireless channel quality. A computing system can generate path loss estimates for a user device by creating a matrix from SINR observations for the user device and transmission power levels for different base stations in a given geographic region. A computing system of the OSS can analyze the path loss vectors for the various user devices. Based on this analysis, the computing system can provide control signals to respective base stations in the region to auto-adjust or self-regulate transmission parameters of the base stations to enhance or optimize channel quality between each mobile device and their serving base station.

One aspect of the subject matter described in this specification can be embodied in a method performed by one or more computers. The method includes receiving, by the one or more computers, signal quality data for user devices that each communicate wirelessly with at least one base station in a set of base stations, the signal quality data indicating signal reception quality levels for the user devices for a plurality of times. The method also includes receiving, by the one or more computers, transmission power data indicating transmission power levels of the base stations at the plurality of times; and based on the signal quality data and the transmission power data, determining, by the one or more computers, signal quality levels for the user devices for different times corresponding to different combinations of transmission power levels of the base stations. The method further includes estimating, by the one or more computers, channel attenuation levels for wireless communication channels between the user devices and the base stations based on differences among signal quality levels of the multiple user devices corresponding to the different combinations of transmission power levels of the base stations; and providing, by the one or more computers, operating parameters to one or more of the base stations based on the estimated channel attenuation levels.

These and other implementations can each optionally include one or more of the following features. For example, in some implementations, receiving the signal quality data comprises receiving signal quality reports that indicate signal-to-interference-plus-noise ratio (SINR) information. In some implementations, receiving the signal quality reports comprises receiving, from the base stations in the set of base stations, data from signal quality reports sent from the user devices to the base stations. In some implementations, the base stations are base stations of a self-organizing network, and the one or more computers are part of an operations support system (OSS) for the self-organizing network. In some implementations, the base stations are access points of a Wi-Fi network or base stations of a cellular network.

In some implementations, estimating the channel attenuation levels includes estimating a channel attenuation level between each of the mobile devices with respect to each of the base stations. In some implementations, the different combinations of transmission power levels of the base stations result from the base stations varying their power levels in normal operation. In some implementations, the wherein the different combinations of transmission power levels of the base stations result from changes in transmission power determined by the base stations based on varying data transfer demand or varying wireless channel conditions. In some implementations, the method further includes instructing, by the one or more computers, changes in the transmission power levels of the base stations to cause the base stations to transmit at different combinations of power levels at the plurality of different times.

In some implementations, the instructed changes include changes to change the combinations of power levels which are not made based on data transfer demand or varying wireless channel conditions. In some implementations, the method also includes receiving the signal quality data for the user devices for each of multiple frequency channels; receiving the transmission power levels for the base stations for each of the multiple frequency channels; and estimating the channel attenuation measure between the user devices and the base stations for each of the multiple frequency channels. In some implementations, estimating the channel attenuation levels includes: generating, for a first user device of the user devices, a first matrix indicating relationships between signal quality of the first user device and the different combinations of transmission power levels of the base stations; and using the first matrix to estimate values of a second matrix, wherein the values represent path losses of the first user device with respect to different base stations in the set of base stations.

In some implementations, the first matrix has multiple rows that each represent a measurement of signal quality of the first user device at a different time corresponding to the row, the values in each row being determined using transmission power levels of the base stations at the time corresponding to the row. In some implementations, estimating the channel attenuation levels includes determining a least squares estimate for the values in the second matrix. In some implementations, estimating the channel attenuation levels includes: generating, for the first user device, multiple first matrices each corresponding to a different frequency channel in a set of multiple frequency channels; and estimating, for the first user device, values of multiple second matrices each corresponding to a different frequency channel in the set of multiple frequency channels. In some implementations, providing the operating parameters includes providing the operating parameters using the simple network management protocol (SNMP). In some implementations, providing operating parameters includes providing, to a first base station of the set of base stations, operating parameters indicating a transmission power setting for the first base station or an antenna downtilt setting for the first base station.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments and may result in one or more of the following advantages. The described techniques enable base stations and user devices of wireless communication systems to realize computing efficiencies of self-organized networks. For example, the techniques include using changes in transmission power levels of individual base stations to trigger reporting of signal quality data by the user devices. The signal quality data is used by a server to estimate channel attenuation levels between base stations and user devices in a communication network.

The described advantages further include computing processes for analyzing how different combinations of transmission power levels and other network operating parameters affect the signal quality experience at the user device. For example, multiple different combinations power levels and signal quality values can be analyzed using least squares computational approach. Based on this analysis, the server provides control signals to respective base stations to auto-adjust or self-regulate transmission parameters to optimize channel/signal quality between a user device and its serving base station.

Optimized transmission power levels and improved signal quality can result in reduced power consumption and processor utilization by base stations and user devices in a wireless network. In particular, improved signal quality results in more stable data connections between base stations and user devices in a wireless network. Such stable connections lead to reductions in processor utilization and signal processing operations that may be needed to reestablish failed or severed data connections that occur when the described techniques are not employed. Hence, system throughput is increased thereby leading to more efficient processor and memory utilization, which is an improvement to the computer system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
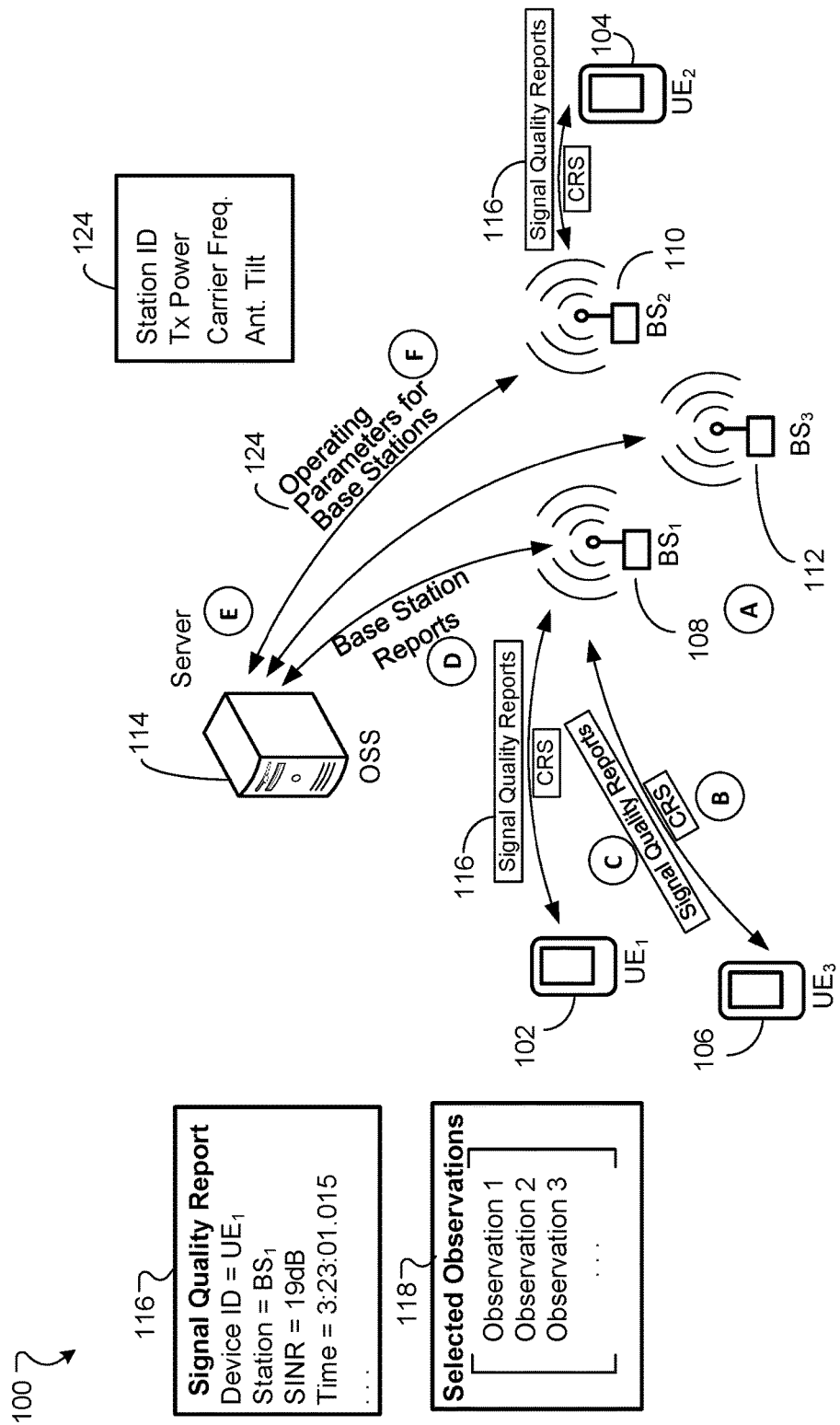
FIG. 1 is a diagram that illustrates an example communications system.

FIG. 1 illustrates an example communications system 100. System 100 includes multiple user devices 102, 104, and 106, individual base stations 108, 110, and 112, and at least one server 114. The system 100 can represent a self-organizing network (SON), where server 114 includes one or more computers that are part of an operations support system (OSS) for the SON. In a SON, connected devices can trigger auto-configuration and self-optimization of operating parameters in response to observed performance and signal conditions of the network. In cellular or wireless networks, a SON can provide improved data rates and throughput compared to static or manually defined networks, as well as enhance the performance and reliability of the network.

To apply optimization techniques afforded by SONs, server 114 may obtain information that describes a propagation environment of a network represented by system 100. For example, server 114 can receive signal quality data that indicates interference from the base stations of the system 100. From signal quality measurements and base station transmission power levels, the server 114 can estimate a path loss between each base station and each user device of system 100. As described below, channel measurements that include signal quality information can be generated based on based on reference signals transmitted from base stations and that are received at user devices of system 100. These measurements are performed at the user devices, and each user device can generate reports that are received at server 114. Using signal quality data included in the reports, server 114 generates operating parameters for each base station of system 100. Server 114 provides each base station its respective operating parameters, and the base stations use the received operating parameters to minimize signal interference within the network and improve the propagation environment of the network.

System 100 is an example communications system for enabling wireless communication services for each of user devices 102, 104, and 106. Each user device can be a computing device, such as a cellular telephone, a smart phone, a laptop/desktop computer, a tablet device, an electronic reader, a streaming device, or another electronic device for use in a wireless network. The system 100 may be a cellular communications system. In some implementations, system 100 may include radio network controllers, radio frequency antennas, transceivers, and other electronic components that form a Universal Terrestrial Radio Access Network (UTRAN). In general, networks of system 100 may interact with other networks in a larger Universal Mobile Telecommunications System (UMTS) to exchange data between different user devices.

System 100 can be a wireless communications system that provisions resources for transmitting and receiving data using one or more data transfer technologies. For example, system 100 can use circuit switching technology or Internet Protocol (IP) based packet switching technology to enable and manage data flow between devices of the system. In other implementations, system 100 is a wireless communication system having a wireless area network (WAN) where the base stations 108, 110, or 112 are wireless access points. For example, system 100 can be a Wi-Fi network (e.g., according to IEEE 802.11 standards).

Each of base stations 108, 110, and 112 can allocate communication resources, e.g., time slots and/or frequency channels for transmitting and receiving data. The resources represent communication channels and the base stations can transmit data to user devices 102, 104, and 106 and receive data from the user devices via the communication channels. In some implementations, a communication channel is an air interface channel that base stations and user devices use to exchange data through an uplink and/or downlink.

In stage (A), each base station of system 100 sends a downlink reference signal. The reference signal can be a cell-specific reference signal (CRS), such as those sent according to the Long-Term Evolution (LTE) standard. The reference signal can be sent on multiple frequency channels. In some implementations, the reference signal is sent periodically, for example, every millisecond. The timing of the base stations and the user devices can be synchronized, for example, using GPS signals or other time synchronization techniques. Each of the base stations can be synchronized to transmit their reference signals simultaneously, so that interference between neighboring base stations can be evaluated.

In stage (B), the user devices 102, 104, 106 each receive the reference signal from the base station that currently serves the user device. Each user device of system 100 generates signal quality data based on the downlink reference signal for its serving base station. For example, each user device can compute an amount of power received for the downlink reference signal, and a total amount of power received on the frequency channel. The user device may compute indicators such as a received signal strength indicator (RSSI), a received signal received power (RSRP), a reference signal received quality (RSRQ), and/or other indicators of power received. For the computed indicators, the received signal is the reference signal. Other measures that indicate signal quality can be determined in addition or as an alternative. For example, using power measurements of received reference signals, a user device can generate a Channel Quality Indicator (CQI) that indicates a signal-to-interference-plus-noise ratio at the user device, based on the most recent reference signal received.

In stage (C), each user device sends signal quality data as signal quality report 116, which can indicate a signal-to-interference-plus-noise ratio (SINR), CQI, or other signal quality data. The reports 116 may include any and all of the signal quality data discussed above. In some implementations, the reports 116 provide information about signal reception quality for each of multiple frequency channels that are available between the user device and its serving base station. For example, if the wireless system 110 has ten frequency channels, the report 116 from a user device can indicate a separate SINR for each of the frequency channels. Each user device can send a report 116 at a predetermined interval, e.g., each millisecond, to indicate the measurement for each reference signal received.

The signal quality data indicated in the signal quality reports 116 reflects a signal path loss affecting the user device and interference from neighboring base stations. For example, a user device 102 can receive a reference signal transmitted by a serving eNB (e.g., base station 108) as well as a reference signal transmitted by an interfering eNB (e.g., base station 110). As described in more detail below, each of the base stations 108 and 110 transmits its reference signals using a certain transmission power, which can vary over time. The signal quality report 116 from the user device 102 indicates interference and signal propagation conditions affecting the user device 102, e.g., showing the effects of transmissions from the serving base station 108 and interfering base stations.

Each user device of system 100 transmits signal quality reports 116 to its serving base station. As shown, the signal quality report 116 can include a variety of information relating to received signal and interference data, such as an identifier for the user device submitting the report 116, an identifier for the serving base station, channel quality information or a specific SINR value, and a time/time stamp for the signal quality report.

In state (D), each base station 108, 110, 112 receives the signal quality reports 116 from the user devices it serves. Each base station forwards information from the signal quality reports 116 to the server 114. Each base station also sends data to the server 114 to indicate its transmission power levels. Thus, a base station indicates to the server 114 the power level of the transmission of the reference signal, and the resulting signal quality experienced by each of the user devices served at the time.

In state (E), server 114 receives the data sent by the base stations. The server 114 collects the reporting data over time. Server 114 can aggregate the received signal quality reports 116 and base station transmission power levels across all of the base stations in the system 100. From the timestamps or other data in the reports, the server 114 can determine the transmission power of each of the base stations of the system 100, at each measurement point indicated by the signal quality reports 116. From this data, the server 114 can identify times when different combinations of transmission power levels were used by the base stations. These instances when different combinations of power levels are used, and the corresponding SINR or other signal quality measures for the user devices, represent observations 118 that include useful data points for estimating channel attenuation of communication channels used in system 100.

Server 114 uses the signal quality data and corresponding base station power levels to estimate path loss values that indicate channel attenuation between each base station and each user device of system 100. A channel attenuation level can represent a computed signal path loss or coupling loss that causes degradation of a communications channel between a base station and a user device. Techniques for determining the channel attenuation levels are discussed in further detail with respect to FIGS. 2 and 3. Server 114 can estimate multiple sets of path loss values. For example, server 114 can determine, for each user device, a different channel attenuation level with respect to each base station in the system 100, or at least each base station in a particular area that includes the user device. In addition, channel attenuation levels can be determined for each user device and each base station for multiple different frequency channels. As an example, if a system includes three base stations and operates using three different frequency channels, then nine channel attenuation levels can be determined for each user device—one for each combination of base station and frequency channel. The channel attenuation levels enable the server 114 to predict how altering transmission power and other operating parameters of the base stations will affect the user devices. For example, from the channel attenuation levels, the server 114 can determine whether increasing the transmission power of a particular base station will increase or decrease the SINR of each user device in the system 100, and to what extent each user device would be affected.

In state (F), server 114 uses the estimated channel attenuation levels to determine operating parameters for the base stations of the system 100. The server 114 then sends the operating parameters to the base stations to improve the performance of the system. The server 114 determines settings that improve the overall performance (e.g., signal quality, data rates, and data throughput) of the wireless network of system 100. Using the channel attenuation levels, server 114 determines a set of base station operating parameters 124 for each base station of system 100. As discussed above, channel attenuation levels can indicate how changes in certain base station operating parameters can impact signal quality and channel attenuation experienced by user devices.

Server 114 provides a set of operating parameters 124 to each of base station 108, 110, 112. The operating parameters 124 for a base station may be settings that enable the base station to effectively serve its user devices, while limiting or minimizing interference to user devices served by neighboring base stations. The base station operating parameters 124 for a base station can include a transmission power, a carrier frequency assignment, and/or an electrical antenna tilt angle. For example, each base station 108, 110, 112 can be sent a separate set of parameters to use, and each set of parameters can be labeled with a base station identifier. The set of parameters may specify a certain transmission power to use when communicating with served user devices. The set of parameters may specify one or more frequencies (e.g., carrier frequencies) to use or to avoid. The set of parameters may specify an electrical downtilt or uptilt for digital antenna of the base station. Adjusting the antenna downtilt can increase signal reception by served user devices or may limit interference with non-served user devices.

For example, using the channel attenuation levels, server 114 may determine that an incremental transmission power increase for a certain base station may increase SINR of served user devices by 1 dB, but decrease the SINR of other base stations by varying amounts, e.g., 0.25 dB, 0.5 dB, etc. If the served user devices are experiencing a low signal quality, e.g., less than a predetermined SINR threshold, the server 114 can assess whether increasing the transmission power can raise the signal quality of the served user devices to a desired level without reducing signal quality of other base stations below the desired level. Similarly, server 114 may find that reducing the power of interfering base stations may allow the SINR to increase for a set of user devices, while still allowing the acceptable SINR for the user devices served by the interfering base stations. In general, a desired threshold or range for a channel characteristic can be used to evaluate signal quality, e.g., a desired SINR threshold of greater than 10 dB. Server 114 can identify user devices that do not have at least this level of signal quality for one or more frequencies, and then determine how to adjust base station power levels and other parameters, for each base station individually, to result in as many of the user devices in the system 100 as possible achieving the desired signal quality level.

To optimize performance of base stations in a wireless network, parameters such as base station transmission power, carrier frequency, and/or an electrical down/up tilt can be periodically adjusted during network operation. For example, stages (A)-(F) can be repeated to generate new operating parameters for the base stations at any appropriate interval, e.g., every 15 minutes, every hour, daily, weekly, monthly, etc. The data acquisition in stages (A)-(D) can be carried out frequently, on an ongoing basis, for example, every millisecond or more or less frequently. The server 114 may collect data over a time period until sufficient reports are obtained, representing a sufficient number of different combinations of transmission power levels of the base stations. Once the server 114 determines that an appropriate set of data has been collected, the server 114 may re-evaluate the channel attenuation levels and determine new operating parameters to send to the base stations.

Figure 2:
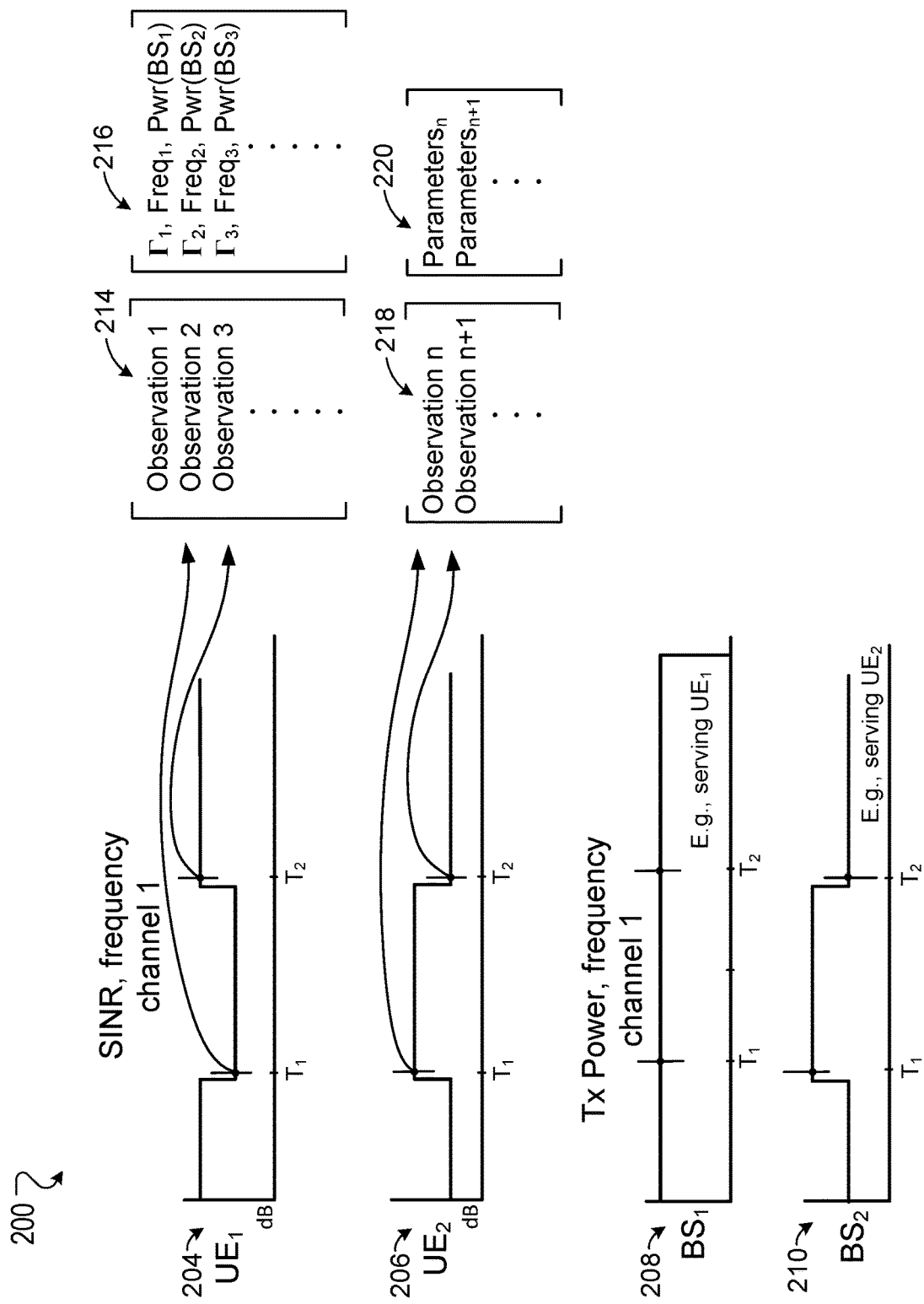
FIG. 2 is a diagram that illustrates transmission power adjustments and signal quality observations in a mobile communication system.

FIG. 2 illustrates graphical data 200 showing transmission power adjustments and signal quality observations in a mobile communication system. Graphical data 200 includes graphs 204 and 206 that represent SINR measurements for certain time-frequency resources as determined by a user device of system 100. Graph 204 shows SINR measurements for frequency channel 1 in a wireless network. For example, graph 204 shows a first SINR measurement determined by a user device (user equipment $UE_1$) at time $T_1$ and a second SINR determined by $UE_1$ at a later time $T_2$. Similarly, graph 206 shows distinct SINR measurements computed by $UE_2$ at respective times $T_1$ and $T_2$ that correspond to times $T_1$ and $T_2$ of graph 204. In some implementations, SINR measurements are determined, by user devices, for multiple frequency channels through which the user devices exchange data with different base stations of a wireless network.

Graphical data 200 further includes graphs 208 and 210 that represent signal transmission power measurements for certain time-frequency resources of a particular base station of system 100. Graph 208, 210 each show transmission power measurements for frequency channel 1 in a wireless network. For example, graph 208 shows distinct reference signal transmission power measurements of a base station ($BS_1$) as determined by user device 102 at respective times $T_1$ and $T_2$. In graph 208, $BS_1$ is the serving base station for user device 102 and times $T_1$ and $T_2$ correspond to times depicted at graphs 204 and 206. Likewise, graph 210 shows distinct transmission power measurements of a base station ($BS_2$) as determined by $UE_2$ at respective times $T_1$ and $T_2$. In graph 210, $BS_2$ is the serving base station for $UE_2$ and times $T_1$ and $T_2$ correspond to times $T_1$ and $T_2$ depicted at graphs 204 and 206 described above. In some implementations, transmissions power measurements are determined for multiple beginning frequency channels through which user devices exchange data with different base stations of a wireless network.

Graph 204 can include a time period before time $T_1$ that represents a network operating scenario in which $UE_1$ experiences no quantifiable noise, interference, or impact on received signal quality when exchanging data communications using carrier frequency, Freq. 1. As used herein, a carrier frequency (Freq. "n") corresponds to a base frequency, in hertz, of an example communication channel. Unlike graph 204, graph 206 can represent an operating scenario in which $UE_1$ experiences noticeable noise, interference, or impact to received signal quality at the communication channel.

As indicated by graph 210, the noise or interference affecting the communication channel between $UE_1$ and $BS_1$ is due to the increase or adjustment in transmission power of signals (e.g., a reference signal) transmitted from $BS_2$ between times $T_1$ and $T_2$. In some implementations, $BS_1$ and $BS_2$ may be adjacent base stations of distinct wireless cells, where certain adjustments or increases in transmission power of one base station causes noise, co-channel interference, or channel attenuation in the communication channel of an adjacent base station located in a neighboring cell. For example, based on the channel interference, a $UE_1$ (a smartphone) may experience degraded signal quality while using a communication channel to complete a wireless phone call due to the SINR between times $T_1$ and $T_2$.

Graph 206 can represent a network operating scenario in which $UE_2$ experiences noticeable noise or interference (e.g., due to a transmission power of $BS_3$) that impacts the received signal quality of a communication channel between $UE_2$ and $BS_2$ but before time $T_1$. The communication channel can be used to exchange data communications using carrier frequency, Freq. 2. However, no quantifiable noise or interference impacts the received signal quality of the communication channel when $BS_2$ increases signal transmission power. In some implementations, increasing signal transmission power of $BS_2$ from time $T_1$ to time $T_2$ improves signal quality of the communication channel between $UE_2$ and $BS_2$ but results in SINR that degrades signal quality of the communication channel between $UE_1$ and $BS_1$ during the same time period.

Server 114 compiles a dataset of network operating parameters to achieve improved signal quality for each communication channel between a user device and a base station. For example, server 114 can execute a channel sounding algorithm, where execution of the channel sounding algorithm causes a base station to adjust transmission power used to transmit reference signals. In some implementations, user device 102 monitors signal characteristics of reference signals transmitted by base station 108. In response to monitoring the reference signal, user device 102 computes a reference signal received power (RSRP) value that can be used to detect or determine adjustments in a transmission power of base station 108.

For example, user device 102 can compare a current reference signal power value to a previous reference signal power value to detect or determine adjustments in transmission power based on a computed difference in the power value of a prior reference signal relative to a power value of a current reference signal. In response to detecting adjustments or changes in transmission power, user device 102 can generate a signal quality report 116 that includes data about the SINR measurements. In some implementations, user device 102 computes SINR measurements based on a predetermined reporting schedule and generates a signal quality report 116 that is sent to a serving base station using reporting intervals of the predetermined schedule.

Signal quality experienced by a user device can be characterized using the SINR, which is defined as:

$$\Gamma = h_1 p_1 \bigg/ \left( \sum_{i>1, i \, active} h_i p_i + \sigma \right) \quad (1)$$

where $h_1$ is the path loss between the serving base station and the user device, $p_1$ is the transmission power of the serving base station, $h_i$ is the path loss between base station i and the user device, $p_1$ is the transmission power of the interfering base station i, and σ is the noise experienced by the i. Note that when a base station (e.g., interfering base station) is not actively transmitting data its transmission power on the time-frequency resources where the user device measures its SINR may be zero. For this reason, the interference term in the equation above represents a summation only over the actively transmitting interfering base stations.

In some implementations, the channel sounding algorithm works as follows. During regular operation different base stations may be periodically instructed by server 114 to make small adjustments to the base station's transmission power, e.g., by increasing or decreasing the power by 1 dB. When the instructions are provided and power adjustments occur, the respective transmission power of each base station is recorded and a parameter value indicating whether the base station is in an active or inactive state is also recorded. Additionally, the SINR experienced by each user device is also recorded. Different combinations of transmission power levels and SINR measurements are provided to server 114 and used to create observations 118 for estimating channel attenuation for different communication channels of a wireless network. The server 114 can assess the set of data collected to determine which combinations of power levels still need to be observed. For example, the server 114 may determine that a certain base stations have maintained the same transmission power for a period, and that variation between those base stations is needed to determine the interference among the base stations. As a result, the server 114 may vary the transmission power levels of one or more of them, e.g., to increase the transmission power of one base station for a time period, to decrease the transmission power of another base station for another time period, and so on, until an appropriate amount of variation among the base station is observed to allow calculation of the channel attenuation measures.

In other implementations, server 114 might not direct operation of the base stations or instruct the base stations to make changes in transmission power for the purpose of creating different combinations of power levels at different times. Rather, changes or adjustments in base station transmission power levels may occur through normal operation of the base stations, without being directed by the server 114. For example, changes in base station transmission power levels can occur automatically due to inherent variations in user device resource demands. For example, at certain time slots and for certain frequencies, some base stations may not transmit because there is no served device requiring a downlink data transfer. Different combinations of power levels and signal quality data can be compiled from the incremental changes in transmission power that occur from the varied demands. Hence, periodic changes in transmission states of the base stations, e.g., from off/unloaded to on/loaded, can be sufficient for creating a certain quantity of data values for estimating the channel attenuation. Similarly, base stations may adjust their transmission power to support different data rates, to respond to changing context or channel conditions (e.g., weather, changes in foliage, positions of served devices, changing locations of vehicles, change in number or location of base stations, etc.), to respond to user device channel measurements, or for other reasons besides being instructed to make a change by the server 114.

Data values for each set of recordings form an observation and for each observation the equation (1) described above is rearranged allowing for the following linear expression (equation (2)) of the path loss associated with each base station to be formed.

$$h_1 p_1(t) / \Gamma(t) - \sum_{i>1} h_i p_i(t) = \sigma \qquad (2)$$

In this equation (2), $p_i(t)$ is the transmission power of base station i (interfering base station) at time t and $\Gamma(t)$ is the SINR measured by the user device at time t. Note that if a base station i is inactive at time t then $p_i(t)$ is set to zero.

Referring again to FIG. 2, observation datasets 214 and 218 can include discrete numbered entries that correspond to individual SINR measurements provided respectively by devices $UE_1$ and $UE_2$. Each SINR measurement of observation datasets 214 and 218 can include a set of signal quality parameters 216 and 220 that forms the signal quality reports 116 received respectively at $BS_1$ serving $UE_1$ and $BS_2$ serving $UE_2$. The parameters can include SINR measurements ($\Gamma$) and communication channel information (e.g., frequency or channel ID) as well as measured base station transmission power as determined by the UE.

Each computed SINR measurement can include a time stamp that indicates a current time of the measurement. Similarly, each transmission power measurement determined by a user device for a particular base station can include a time stamp that indicates a current time of the measurement. In some implementations, each base station records its own transmission power (and time stamp) when transmitting a reference signal to a user device. The base station can provide the recorded transmission power and time stamp to server 114 along with the corresponding signal quality report 116 generated by the user device based on the received reference signal.

Figure 3:
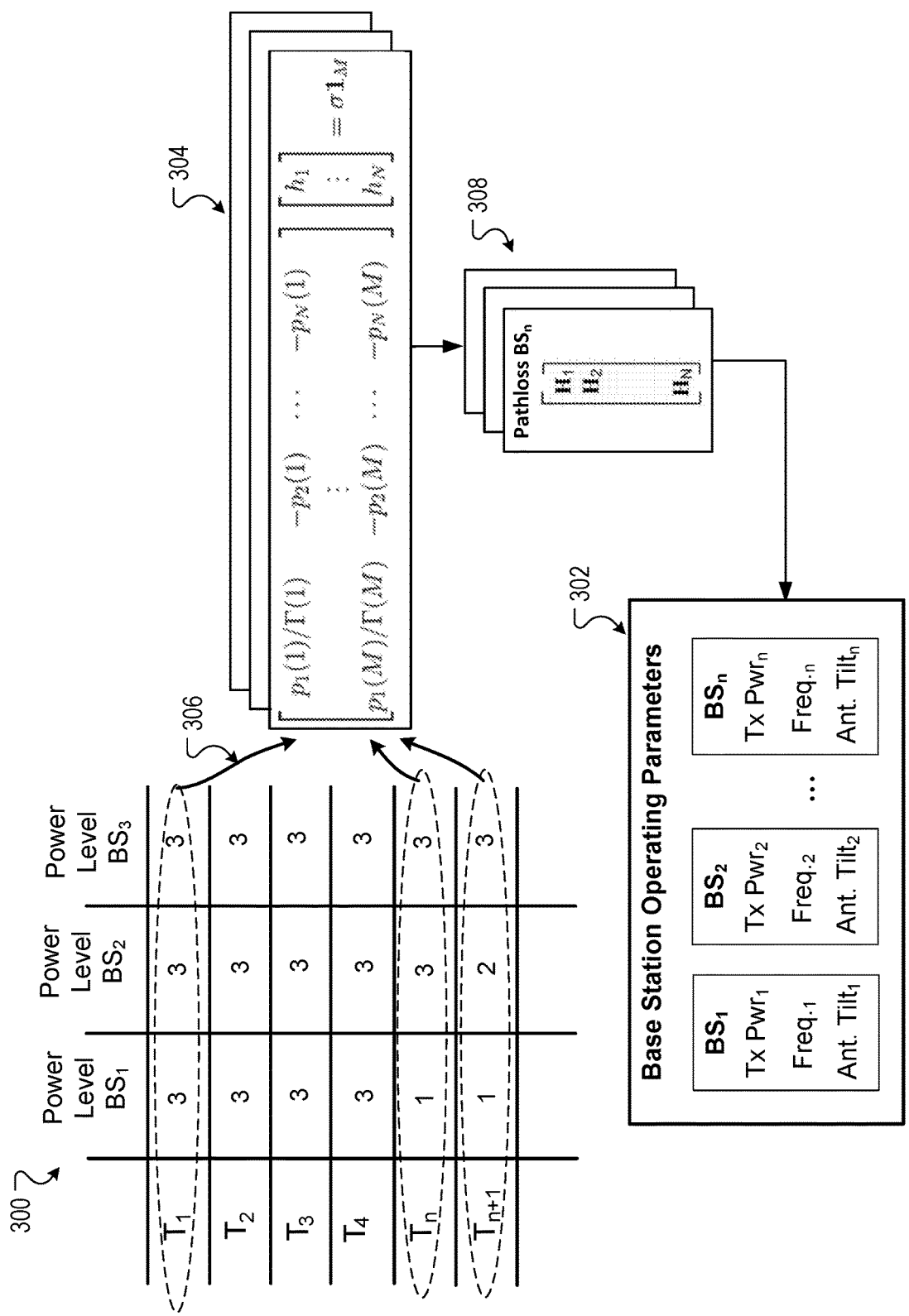
FIG. 3 illustrates an example dataset that includes transmission power data indicating transmission power levels of multiple base stations.

FIG. 3 illustrates an example dataset 300 that includes transmission power data indicating transmission power levels of multiple base stations. Different matrices 304 can represent various combinations 306 of transmission power levels for each base station and measured signal quality for each user device. A matrix 304 can represent useful data points for estimating channel attenuation of communication channels used in system 100. A channel sounding algorithm is executed by server 114 to analyze SINR measurements, transmission power levels, and other data values to estimate channel attenuation of a communication channel. A wireless network communication channel may achieve maximum data rates and data throughput for certain different combinations of transmission power levels and signal quality measurements (SINR).

As described below, transmission power data, signal quality data, and channel attenuation for each communication channel is mapped to certain wireless network parameters that represent maximum or optimized performance. For example, server 114 can scan certain transmission power values, carrier frequencies, and electrical tilt angles for each base station, e.g., an access point or other signal transmitter, in a wireless network. In response to scanning, server 114 can identify sets of base station operating parameters that result in maximum data throughput for a particular set of carrier frequencies. Server 114 can then generate distinct sets of operating parameters 124 for each base station and automatically configure each base station using sets of parameters 124 that will maximize data throughput for communication channels in the wireless network.

Data values for different sets of base station operating parameters 302 are determined for each base station using computations for a respective matrix structure 304. Using the signal quality data of the signal quality reports 116 and the different combinations 306 of transmission power data included in dataset 300, server 114 can determine base station operating parameters 302. For example, computers of server 114 can analyze dataset 300 to identify when the base stations have different combinations 306 of power levels that ultimately result in maximum data throughput for certain communication channels and carrier frequencies.

For each base station, a respective matrix structure 304 combines many observations of changes in SINR at user devices that communicate with the base station over a particular time period. The observations also include different combinations 306 of transmission power data and power levels. Transmitted base station power levels may vary depending on the size of a wireless network cell or area for which the base station is providing coverage. For example, transmitted power levels can range from: 1 watt-33 watts for a low power level indicated by "1" of dataset 300, 34 watts-66 watts for a medium power level indicated by "2" of dataset 300, or 67 watts-100 watts for a high power level indicated by "3" of dataset 300.

In some implementations, a short form equation ($Ph=\sigma 1_M$) corresponding to a respective matrix structure 304 is used to generate a least square estimate for computing a path loss 308 relating to each user device. The path loss is computed for the communication channels shared by a particular base station and user devices of system 100 that interact with the particular base station. For example, the observations can be used to determine or deduce channel attenuation between base stations and user devices. Server 114 uses the channel sounding algorithm to estimate a path loss A between each base station and each user device. This channel sounding technique can include a processing device of server 114 forming at least one set of equations for each set of observations included in a respective matrix 304. The technique further includes server 114 concatenating sets of observations into a larger matrix data structure that includes corresponding vectors. Channel attenuations (e.g., path loss values) can then be determined by computing a least squares estimate of the path losses using the following equation (3):

$$h_{estimate} = \sigma P^+ 1_M \qquad (3)$$

In equation (3) the operand "+" denotes a pseudo-inverse.

In some implementations, base stations of system 100 may frequently transition from a loaded to unloaded state, e.g., from actively transmitting signals (loaded) to not actively transmitting signals (unloaded). When this transition occurs, server 114 may determine that it no longer needs to provide instructions or control signals to the base stations to impose periodic changes in the transmission power of base stations 108, 110, 112. Instead, the inherent and periodic variations in transmission states of the base stations, e.g., from off/unloaded-to-on/loaded, can be sufficient to ensure that matrix data structure 304 is well conditioned to include a sufficient quantity of data values for estimating the path losses using the above described computing processes.

Based on these combined observations and execution of the channel sounding algorithm, server 114 infers relationships between changes in transmission power levels of each base station, changes in the SINR of each user device, and associated path loss values computed using each matrix structure 304. Using the inferred relationships, server 114 determines base station operating parameters 302 that ultimately result in maximum data throughput for certain communication channels and carrier frequencies of wireless network represented by system 100.

Figure 4:
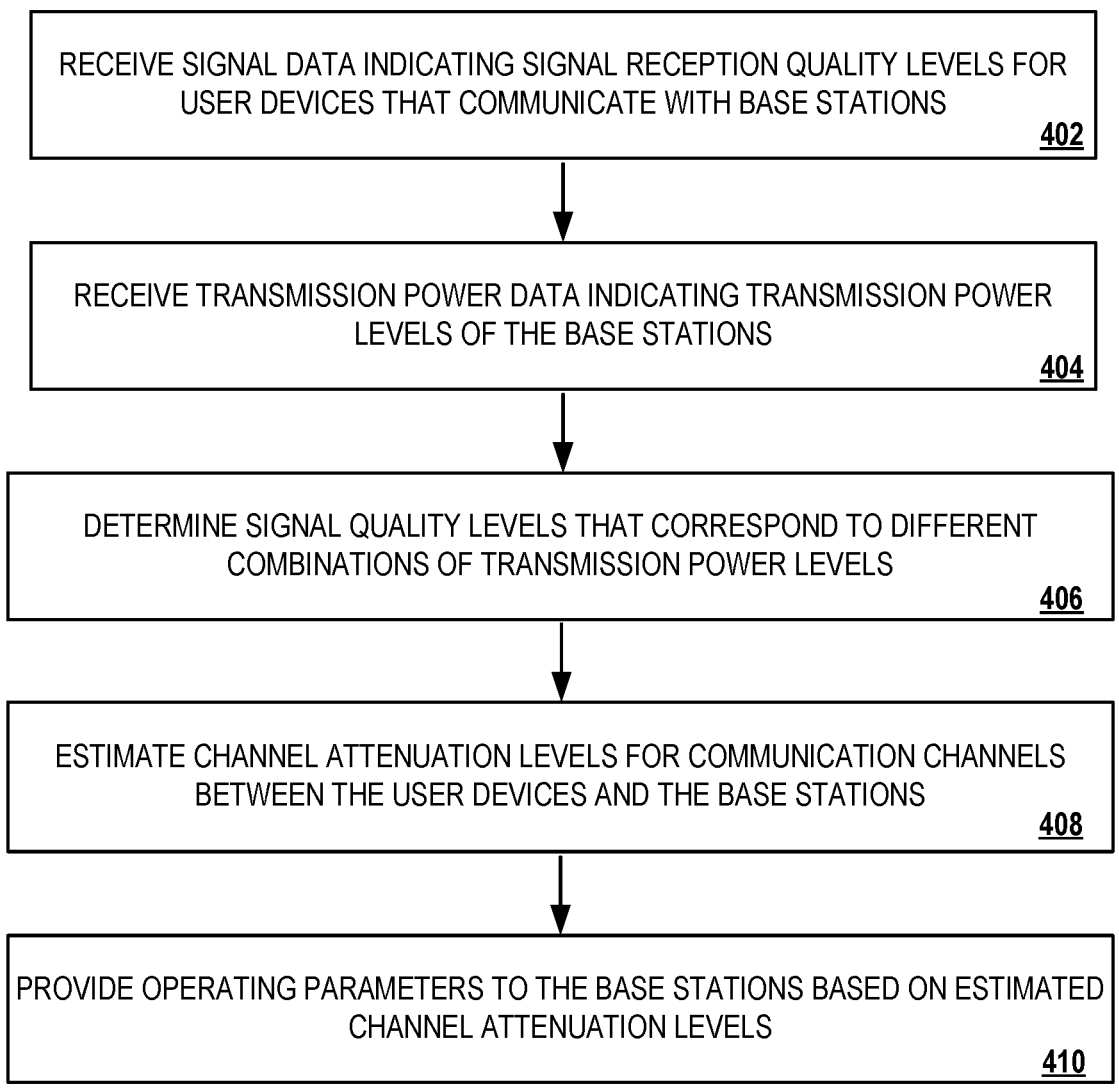
FIG. 4 is a flow chart of an example process for performing channel sounding in a self-organizing network.

FIG. 4 is a flow chart of an example process 400 for determining parameters for a self-organizing network (SON).

At block 402 of process 400, one or more computers receive signal quality data (e.g., SINR) for user devices that each communicate wirelessly with at least one base station in a set of base stations. The computers can be included in the base stations of system 100, in server 114, or both. The signal quality data can indicate signal reception quality levels for the user devices for a plurality of times (e.g., $T_1$, $T_2$, or $T_n$). In some implementations, receiving the signal quality data includes receiving signal to interference and noise ratio (SINR) reports 116. Receiving the signal quality reports 116 can include receiving, from the base stations in the set of base stations, data from signal quality reports 116 sent from the user devices to the base stations. The signal reception quality levels can correspond to reference signal power levels for reference signals received at the user device. Signal quality observations for signal quality reports 116 may be continuously generated by user devices 102, 104, and 106 to monitor changes in SINRs reported by each device.

At block 404 of process 400, the one or more computers receive transmission power data indicating transmission power levels of the base stations at the plurality of times. For example, transmission power data can be power data from each base station reporting their own power usage, per carrier frequency or wireless channel. The base stations can be base stations of a self-organizing network, and the one or more computers can be part of an operations support system (OSS) for the self-organizing network. In some implementations, the base stations are access points of a Wi-Fi network or base stations of a cellular network. The one or more computers can analyze the transmission power data and aligns or synchronizes the transmission power data with SINR or other signal quality data provided by the user devices.

As indicated above, changes in SINR can be reported responsive to incremental adjustments in transmission power performed by a base station of system 100. For example, when a base station 108, 110, or 112 makes a change in transmission power, a corresponding change in SINR of each user device 102, 104, or 106 can be stored in a memory of the device. In some implementations, the computers receive transmission power data in response to passive operating scenario where base stations routinely switch on and off to change transmission power independent of receiving instructions from computers of server 114.

At block 406, based on the signal quality data and the transmission power data, the one or more computers determine signal quality levels for the user devices for different times corresponding to different combinations of transmission power levels of the base stations. For example, computers of server 114 can identify times when the base stations have different combinations of power levels, and then determines the corresponding user device signal quality levels for those times.

At block 408, the one or more computers estimates channel attenuation levels for wireless communication channels (e.g., resource channels) between the user devices and the base stations based on differences among signal quality levels of the multiple user devices corresponding to the different combinations of transmission power levels of the base stations. Estimating the channel attenuation levels can include estimating a channel attenuation level between each of the user devices of system 100 with respect to each of the base stations of system 100. The different combinations of transmission power levels of the base stations may result from the base stations varying their power levels in normal operation. In some implementations, the different combinations of transmission power levels of the base stations result from changes in transmission power determined by the base stations based on varying data transfer demand or varying wireless channel conditions.

In other implementations, server 114 receives signal quality data for user devices for each of multiple frequency channels and receives transmission power levels for the base stations for each of the multiple frequency channels. Server 114 can then estimate the channel attenuation measure between the user devices and the base stations for each of the multiple frequency channels.

Estimating the channel attenuation levels can also include generating a first matrix for a first user device of system 100. The first matrix can indicate relationships between signal quality of the first user device and the different combinations of transmission power levels of the base stations. Process 400 can include server 114 using the first matrix to estimate values of a second matrix. The values can represent path losses of the first user device with respect to different base stations in the set of base stations. In some implementations, the first matrix has multiple rows that each represent a measurement of signal quality of the first user device at a different time corresponding to the row. The values in each row can be determined using transmission power levels of the base stations at the time corresponding to the row.

In some implementations, estimating the channel attenuation levels includes server 114 determining a least squares estimate for the values in the second matrix. Estimating the channel attenuation levels can include generating multiple first matrices for the first user device and estimating values of multiple second matrices for the first user device. Each of the multiple first matrices can correspond to a different frequency channel in a set of multiple frequency channels. Each of the multiple second matrices can correspond to a different frequency channel in the set of multiple frequency channels.

At block 410, the one or more computers provide operating parameters 124 to one or more of the base stations based on the estimated channel attenuation levels. Providing the operating parameters can include the one or more computers instructing changes in the transmission power levels of the base stations to cause the base stations to transmit at different combinations of power levels at the different times. The instructed changes can include changes to change the combinations of power levels which are not made based on data transfer demand or varying wireless channel conditions. In some implementations, operating parameters are provided by server 114 using the simple network management protocol (SNMP). In some instances, operating parameters are provided to a first base station of the set of base stations to indicate a transmission power setting for the first base station or an antenna downtilt setting for the first base station.

Figure 5:
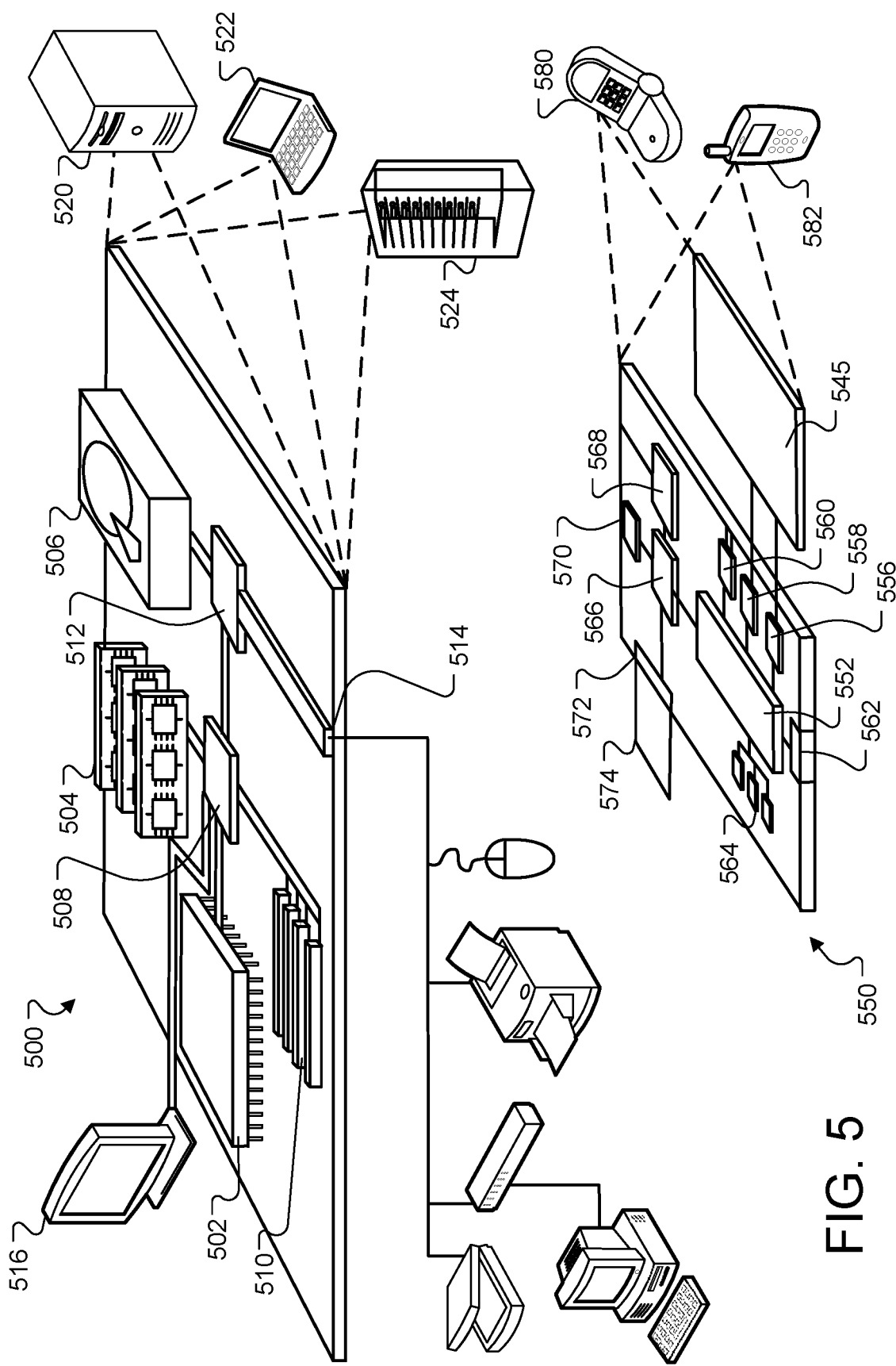
FIG. 5 is a block diagram of a computing system that can be used in connection with computer-implemented methods described in this document.

FIG. 5 is a block diagram of computing devices 500, 550 and systems and methods described in this document may be used to implement these devices, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface.

Such expansion memory 574 may provide extra storage space for device 550, or may also store applications or other information for device 550. For example, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving, by the one or more computers, signal quality data for user devices that each communicate wirelessly with at least one base station in a set of base stations, the signal quality data indicating signal reception quality levels for the user devices for a plurality of times;
   receiving, by the one or more computers, transmission power data indicating transmission power levels of the base stations at the plurality of times;
   based on the signal quality data and the transmission power data, determining, by the one or more computers, signal quality levels for the user devices for different times corresponding to different combinations of transmission power levels of the base stations;
   estimating, by the one or more computers, channel attenuation levels for wireless communication channels between the user devices and the base stations based on differences among signal quality levels of the multiple user devices corresponding to the different combinations of transmission power levels of the base stations, wherein estimating the channel attenuation levels comprises:
      generating, for a first user device of the user devices, data indicating relationships between signal quality of the first user device and the different combinations of transmission power levels of the base stations; and
      using the generated data to estimate values representing respective path losses of the first user device with respect to different base stations in the set of base stations; and
   providing, by the one or more computers, operating parameters to one or more of the base stations based on the estimated channel attenuation levels.

2. The method of claim 1, wherein receiving the signal quality data comprises receiving signal quality reports that indicate signal-to-interference-plus-noise ratio (SINR) information.

3. The method of claim 2, wherein receiving the signal quality reports comprises receiving, from the base stations in the set of base stations, data from signal quality reports sent from the user devices to the base stations.

4. The method of claim 1, wherein the base stations are base stations of a self-organizing network, and the one or more computers are part of an operations support system (OSS) for the self-organizing network.

5. The method of claim 1, wherein the base stations are access points of a Wi-Fi network or base stations of a cellular network.

6. The method of claim 1, wherein estimating the channel attenuation levels comprises estimating a channel attenuation level between each of the user devices with respect to each of the base stations.

7. The method of claim 1, wherein the different combinations of transmission power levels of the base stations result from the base stations varying their power levels in normal operation.

8. The method of claim 7, wherein the different combinations of transmission power levels of the base stations result from changes in transmission power determined by the base stations based on varying data transfer demand or varying wireless channel conditions.

9. The method of claim 1, further comprising instructing, by the one or more computers, changes in the transmission power levels of the base stations to cause the base stations to transmit at different combinations of power levels at the plurality of times.

10. The method of claim 9, wherein the instructed changes comprise changes to change the combinations of power levels which are not made based on data transfer demand or varying wireless channel conditions.

11. The method of claim 1, comprising:
   receiving the signal quality data for the user devices for each of multiple frequency channels;
   receiving the transmission power levels for the base stations for each of the multiple frequency channels; and
   estimating the channel attenuation levels between the user devices and the base stations for each of the multiple frequency channels.

12. The method of claim 1, wherein estimating the channel attenuation levels comprises:
   generating a first matrix that includes the data indicating relationships between signal quality of the first user device and combinations of transmission power levels of the base stations; and
   generating, using the first matrix, a second matrix that includes the estimated values representing the respective path losses of the first user device with respect to different base stations in the set of base stations.

13. The method of claim 12, wherein the first matrix has multiple rows that each represent a measurement of signal quality of the first user device at a different time corresponding to the row, the values in each row being determined using transmission power levels of the base stations at the time corresponding to the row.

14. The method of claim 12, wherein estimating the channel attenuation levels comprises determining a least squares estimate for the values in the second matrix.

15. The method of claim 12, wherein estimating the channel attenuation levels comprises:
   generating, for the first user device, multiple first matrices each corresponding to a different frequency channel in a set of multiple frequency channels; and
   estimating, for the first user device, values of multiple second matrices each corresponding to a different frequency channel in the set of multiple frequency channels.

16. The method of claim 1, wherein providing the operating parameters comprises providing the operating parameters using a simple network management protocol (SNMP).

17. The method of claim 1, wherein providing operating parameters comprises providing, to a first base station of the set of base stations, operating parameters indicating a transmission power setting for the first base station or an antenna downtilt setting for the first base station.

18. An electronic system comprising:
one or more computers each comprising one or more processing devices;
one or more non-transitory machine-readable storage devices storing instructions that are executable by the one or more processing devices to cause performance of operations comprising:
receiving, by the one or more computers, signal quality data for user devices that each communicate wirelessly with at least one base station in a set of base stations, the signal quality data indicating signal reception quality levels for the user devices for a plurality of times;
receiving, by the one or more computers, transmission power data indicating transmission power levels of the base stations at the plurality of times;
based on the signal quality data and the transmission power data, determining, by the one or more computers, signal quality levels for the user devices for different times corresponding to different combinations of transmission power levels of the base stations;
estimating, by the one or more computers, channel attenuation levels for wireless communication channels between the user devices and the base stations based on differences among signal quality levels of the multiple user devices corresponding to the different combinations of transmission power levels of the base stations, wherein estimating the channel attenuation levels comprises:
generating, for a first user device of the user devices, data indicating relationships between signal quality of the first user device and the different combinations of transmission power levels of the base stations; and
using the generated data to estimate values representing respective path losses of the first user device with respect to different base stations in the set of base stations; and
providing, by the one or more computers, operating parameters to one or more of the base stations based on the estimated channel attenuation levels.

19. The electronic system of claim 18, wherein:
receiving the signal quality data comprises receiving signal-to-interference-and-noise ratio (SINR) reports, and
receiving the SINR reports comprises receiving, from the base stations in the set of base stations, data from SINR reports sent from the user devices to the base stations.

20. One or more non-transitory machine-readable storage devices storing instructions that are executable by one or more processing devices to cause performance of operations comprising:
receiving, by one or more computers, signal quality data for user devices that each communicate wirelessly with at least one base station in a set of base stations, the signal quality data indicating signal reception quality levels for the user devices for a plurality of times;
receiving, by the one or more computers, transmission power data indicating transmission power levels of the base stations at the plurality of times;
based on the signal quality data and the transmission power data, determining, by the one or more computers, signal quality levels for the user devices for different times corresponding to different combinations of transmission power levels of the base stations;
estimating, by the one or more computers, channel attenuation levels for wireless communication channels between the user devices and the base stations based on differences among signal quality levels of the multiple user devices corresponding to the different combinations of transmission power levels of the base stations, wherein estimating the channel attenuation levels comprises:
generating, for a first user device of the user devices, data indicating relationships between signal quality of the first user device and the different combinations of transmission power levels of the base stations; and
using the generated data to estimate values representing respective path losses of the first user device with respect to different base stations in the set of base stations; and
providing, by the one or more computers, operating parameters to one or more of the base stations based on the estimated channel attenuation levels.

* * * * *